US011466705B2

(12) United States Patent
Nema

(10) Patent No.: US 11,466,705 B2
(45) Date of Patent: Oct. 11, 2022

(54) HYDRAULIC UNIT WITH COMBINED PNEUMATIC/SERVOMOTOR ACTION AND RELATED USE

(71) Applicant: DRAUSUISSE BRASIL COMERCIO E LOCACAO DE UNIDADES HIDRAULICAS INTELIGENTES S.A., Sao Paulo (BR)

(72) Inventor: Ercio Miguel Nema, Sao Paulo (BR)

(73) Assignee: DRAUSUISSE BRASIL COMERCIO E LOCACAO DE UNIDADES HIDRAULICAS INTELIGENTES S.A., San Paulo (BR)

( * ) Notice: Subject to any disclaimer, the term of this patent is extended or adjusted under 35 U.S.C. 154(b) by 0 days.

(21) Appl. No.: 17/289,412

(22) PCT Filed: Oct. 23, 2019

(86) PCT No.: PCT/BR2019/000034
§ 371 (c)(1),
(2) Date: Apr. 28, 2021

(87) PCT Pub. No.: WO2020/087140
PCT Pub. Date: May 7, 2020

(65) Prior Publication Data
US 2021/0396249 A1    Dec. 23, 2021

(30) Foreign Application Priority Data

Oct. 31, 2018  (BR) .......................... 1020180724711

(51) Int. Cl.
*F15B 11/072* (2006.01)
*F15B 1/04* (2006.01)
*F15B 15/14* (2006.01)

(52) U.S. Cl.
CPC .............. *F15B 11/072* (2013.01); *F15B 1/04* (2013.01); *F15B 15/1485* (2013.01); *F15B 2015/1495* (2013.01); *F15B 2211/212* (2013.01)

(58) Field of Classification Search
CPC ......... F04B 9/125; F04B 9/04; F15B 15/1495
See application file for complete search history.

(56) References Cited

U.S. PATENT DOCUMENTS 3,500,753 A    3/1970  Greene
4,765,225 A    8/1988  Birchard
(Continued)

FOREIGN PATENT DOCUMENTS

BR    102016020653 A2    3/2018
CN       107575379 A     1/2018

OTHER PUBLICATIONS

International Search Report dated Jan. 21, 2020 in International Application No. PCT/BR2019/000034.
(Continued)

*Primary Examiner* — Thomas E Lazo
(74) *Attorney, Agent, or Firm* — Baker & McKenzie LLP

(57) ABSTRACT

The present patent of invention relates to a hydraulic unit (U) with a pneumatic cylinder (15) that works jointly with a servomotor (M), together with a ball screw (29) to together move a hydraulic piston pump (8), made up of a hydraulic plunger (7), with related sealing elements to prevent oil leaks, noise, metal-on-metal attrition and loss of efficiency, that is moved upwards and downwards using a ball screw (29) and a pneumatic cylinder (15), jointly with a servomotor (M) which, when moved, pushes the pressurized oil outwards while filling the opposite hydraulic chamber with an oil suction movement, the pumped oil entering a hydraulic pressure accumulator (25), where it remains idle to be used when required and being supplied by the up/down
(Continued)

movement of the piston, generating continuous pumping, which is automatically stopped when the hydraulic pressure accumulator (25) is full and has reached the predetermined hydraulic pressure.

10 Claims, 2 Drawing Sheets

(56) References Cited

U.S. PATENT DOCUMENTS

| | | | |
|---|---|---|---|
| 4,856,967 A * | 8/1989 | Jones | F04B 9/105 |
| | | | 417/342 |
| 5,788,341 A | 8/1998 | Penrod et al. | |
| 5,960,693 A * | 10/1999 | Yuda, Jr. | F15B 15/088 |
| | | | 60/407 |
| 6,068,448 A | 5/2000 | Mach | |
| 6,079,797 A | 6/2000 | Ganzel | |
| 8,359,856 B2 | 1/2013 | Partick | |
| 9,926,947 B2 | 3/2018 | Villar et al. | |
| 2005/0091972 A1 | 5/2005 | Redman | |
| 2017/0107982 A1 | 4/2017 | Cedrone et al. | |

OTHER PUBLICATIONS

European Search Report dated Jun. 15, 2022, in connection with International Application No. PCT/BR2019/000034, 7 pages.

* cited by examiner

HYDRAULIC UNIT WITH COMBINED PNEUMATIC/SERVOMOTOR ACTION AND RELATED USE

CROSS-REFERENCE TO RELATED APPLICATIONS

This U.S. patent application is a 35 U.S.C. 371 national stage application of international patent application number PCT/BR2019/000034 filed on Oct. 23, 2019 which claims priority to Brazilian patent application number 1020180724711 filed on Oct. 31, 2018 which are hereby incorporated by reference their entireties herein for all purposes.

INTRODUCTION

The present patent of invention relates to a hydraulic unit with a pneumatic cylinder that works jointly with a servomotor, which is used to move hydraulic actuators in the most part machines and equipment that use this type of energy, to increase the force applied during oil pumping, resulting in higher pressure. Therefore, the invention can be applied in conventional hydraulic units, making them more compact, silent, as well as solving various problems of same.

FIELD OF APPLICATION

The field of application of the present invention focuses on the movement of hydraulic actuators in diverse machines and equipment.

BACKGROUND OF THE ART

Everyone is aware that conventional hydraulic units boost and control a certain force, which easily enables the control and movement of hydraulic actuators and which present specific functions for industrial machinery, such as, for example, presses, and also power generation, mining and steel industry equipment. These hydraulic units can be equipped with heat exchangers to reduce the high temperature of the oil, wherein the rise of the temperature, often times, is generated by the oil itself, since the recirculation of oil is constant to the tank, when the hydraulic actuators are idle. Even so, they present electric motors that are coupled to the hydraulic pumps, which perform the work of pumping oil from the reservoir thereof. These hydraulic pumps are generally large in size and pump oil to the system on a continuous basis, even when the hydraulic actuators are idle, which results in vibration, noise and heating the oil.

PROBLEMS TO BE SOLVED

Below is a list of some limitations of conventional hydraulic units:

The high consumption of electric energy in conventional hydraulic units, since electric motors work on a constant basis to trigger a hydraulic pump that sends oil to the system uninterruptedly. Still, when hydraulic actuators stand idle, the oil coming from the hydraulic pump is diverted back to the reservoir by means of a valve, usually electrical or mechanical, that needs the strength of the oil. Therefore, this cycle is characterized by the waste of electric energy, since the oil being pumped is not used to perform work.

The heat generation is made by the attrition generated at the moment wherein the oil passes through the return valves to the reservoir. So when it returns to the reservoir, the oil is again pumped and the very movement of suction and compression of the oil in pumping are also source of heat generation.

The generation of noise is due to the attrition that is generated by the metal-to-metal contact in the moving parts of the hydraulic pumps, whether these are the piston, vane or gear models. Even so, this process generates high noises that impair the operator's hearing, which obliges him/her to use ear protectors.

The wear of metal parts and release of solid particles in the system, due to metal-to-metal contact, which touch all the time; this drawback appears in hydraulic pump models which, consequently, generates the increase in mechanical clearance that exists between moving components, whether piston, vane or gear pump. These types of pumps have permanent contact between the moving metal parts, thus generating the detachment of metal solid particles, which are highly harmful to the proper functioning of the directional valves of the system. Therefore, on the imminence of solving these problems, filters of meshes are added, which are tightly closed, ending up restricting the flow of oil, increasing the pressure and decreasing the flow, whereby increasing the temperature of the oil. Still, in the piston pump there is a clearance between the axis and the hole, which allows the displacement of the pistons. Said clearance in new pumps presents 15% loss of initial pressure and hydraulic flow and, with the passage of time, this clearance increases naturally due to wear. With this, there is a loss of efficiency which, consequently, at a given time, the pressure generated does not meet the need for application. The same problem occurs in vane and gear pumps.

The release of solid metal particles is the result of the attrition of the moving parts, which occurs as a function of the constant attrition of the moving parts of the pumps, chiefly in those of piston, vane and gear. This is due to the specific constructive form of each pump.

High temperature due to the attrition of mechanical parts and constant recirculation of oil in venting system.

STATE OF THE ART

The current state of the art anticipates some patent documents which refer to the subject matter in question, such as U.S. Pat. No. 5,261,810A, filed on Sep. 16, 1992 and published on Nov. 16, 1993, entitled "CLOSING AND CLEANING SYSTEM", which consists of a ball screw that activates the axial forward and backward movement of a hydraulic plunger, mounted on the same axial axis, which has the function of drawing and pumping oil The document cited above acts as a piston pump, which comprises a plunger with through-rod on the two faces, and one of these is fixed to the bolt of the ball screw, being only for pumping the oil.

The other document, U.S. Pat. No. 6,079,797A, filed on Feb. 12, 1999 and published on Jun. 27, 2000 entitled, "DUAL ACTION BALL SCREW PUMP", which has a different mechanical construction to the previous one, but, in the same manner, is comprised of a ball screw that is mounted on the same axial axis, with just one piston, which moves according to the rotation of the ball screw.

The above document describes a system that functions as a piston pump, composed of the ball screw bolt, which is fixed at one end of the piston rod and, when the ball rotates, which occurs in both directions, the piston also moves in the axial direction, performing the suction work of oil and pumping, and the whole assembly is aligned on the same axis.

OBJECTIVES OF THE INVENTION

The objectives of the invention are as follows:

Propose a hydraulic unit with pneumatic cylinder that works jointly with a servomotor, capable of performing efficient oil pumping work, saving up to 90% of the consumption of electric energy, compared to the conventional system;

Significantly reduce noise in the work environment, providing the user with a more comfortable environment;

Reduce up to 90% of the volume of oil used in hydraulic reservoirs, so as not to compromise the temperature of the same, which should remain low;

Reduce the temperature of the oil, even using a much smaller volume, and without the need for heat exchangers;

Eliminate oil leaks that are caused by the high temperature of the oil, which dries the seals and generates vibration which, added to a deficient seal, results in leaks that are constant in conventional systems.

SUMMARY OF THE INVENTION

The working of the present invention is based on a mechanism that uses compressed air and a servomotor, along with a ball screw at the tip, to together move a differentiated hydraulic piston pump, consisting of a hydraulic plunger with its sealing elements to eliminate oil leakage and loss of efficiency, which moves up and down, with the aid of a ball screw and a pneumatic cylinder driven by compressed air which, when moved, pushes out the oil under pressure while filling the opposite hydraulic chamber with an oil suction movement, and the pumped oil goes into a hydraulic pressure accumulator, where it remains idle to be used when required, and which is fueled by the movement of up and down the piston, generating pumping, which automatically stops at the moment when the hydraulic pressure accumulator is full and at a predetermined hydraulic pressure.

Advantages of the Invention

The present invention provides the following advantages:

Using a servomotor that is significantly more economical that conventional motors;

Oil cooling—by using compressed air, which activates a pneumatic cylinder that works jointly with a ball screw, and together, move the hydraulic plunger of the hydraulic pump, and is also kept inside the oil reservoir to make use of the low temperature of the pneumatic cylinder generated by the expansion of the compressed air, with the objective of dissipating the heat of the hydraulic oil, which may be generated by another source;

This equipment is more compact and occupies less physical space;

It uses low volume of oil, up to 90% less in relation to the conventional system;

It provides savings of up to 90% in electric energy.

DESCRIPTION OF THE DRAWINGS

The invention will now be described in terms of an embodiment, and for improved understanding, references will be made to the accompanying drawings, represented as follows.

DETAILED TECHNICAL DESCRIPTION OF THE INVENTION

Figure 1:
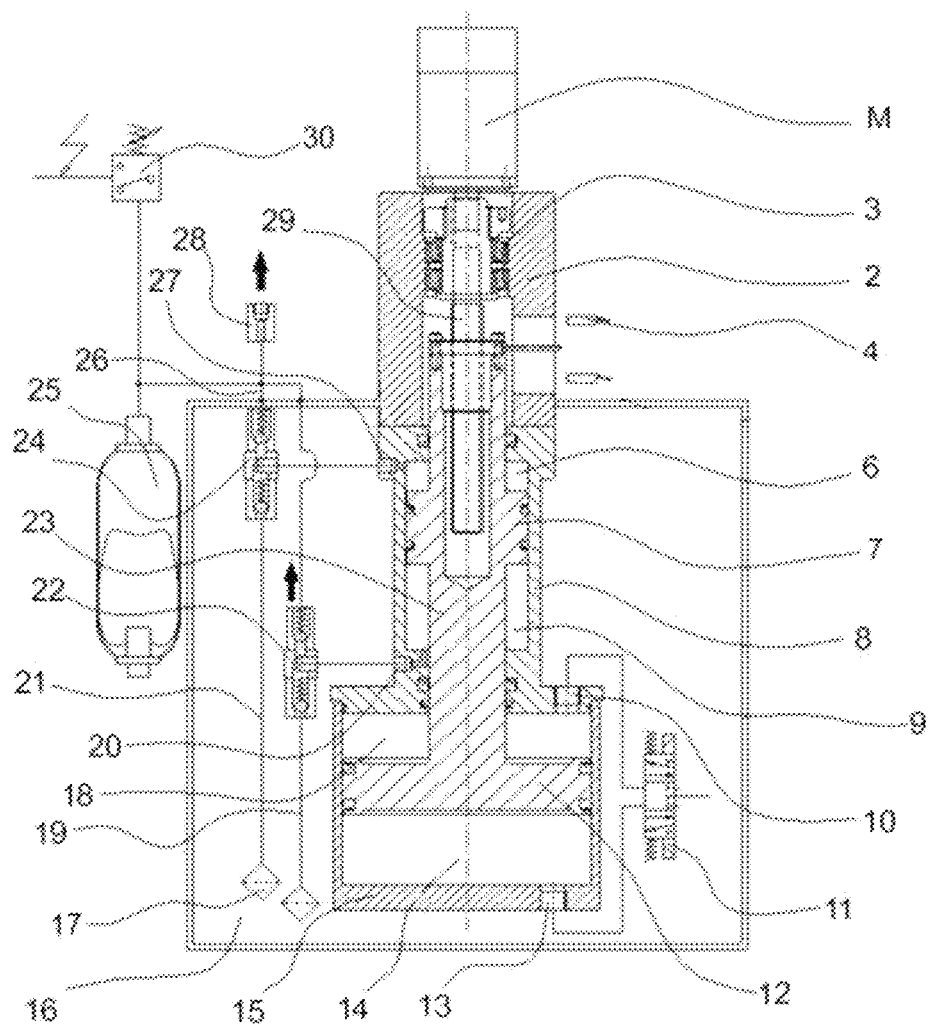
FIG. 1: Sectional view of the complete assembly.
Figure 2:
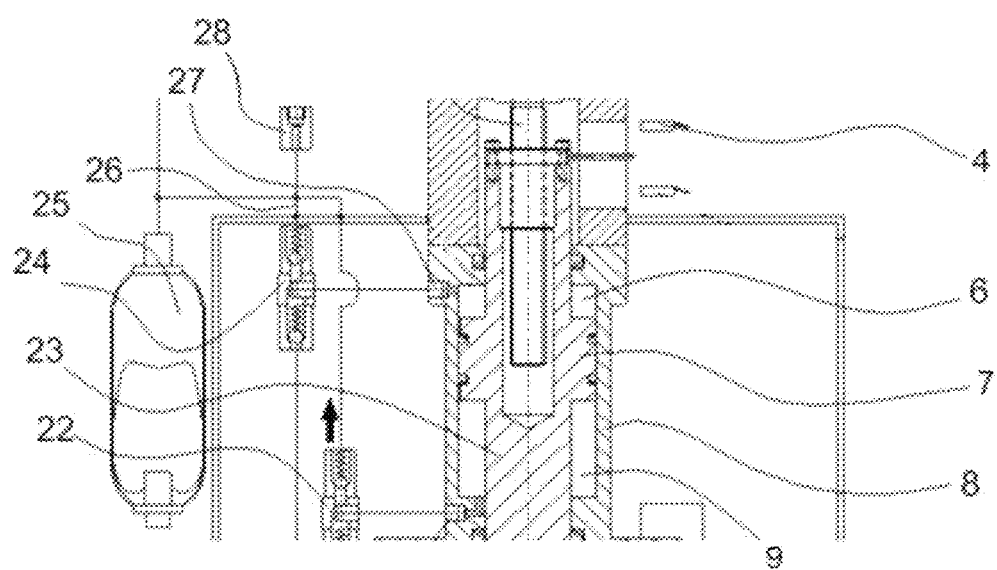
FIG. 2: Enlarged detail of the passage of the oil from the upper hydraulic chamber to the lower hydraulic chamber.

The COMBINED PNEUMATIC/SERVOMOTOR ACTION HYDRAULIC UNIT comprises a pneumatic cylinder (15) that has a pneumatic plunger (12), separating the lower pneumatic chamber (14) from the upper pneumatic chamber (18), where the rod (23) of the pneumatic cylinder (15) is fixed, which is directly linked to a hydraulic plunger (7) which is located inside the upper hydraulic chamber (6) of the hydraulic pump (8), acting as a piston of the hydraulic pump (8), and on the other face of this hydraulic plunger (7), the rod (23) protrudes out of the upper hydraulic chamber (6) to receive the bolt of the ball screw (29), which will receive torque from the servomotor (M) to turn clockwise and counter-clockwise, with the objective of displacing the hydraulic plunger (7) upward and downward, performing the oil pumping process. The ball screw (29) is supported on rollers (3), which sustain radial and axial loads, and are mounted on a bearing (2) to give greater sturdiness to the system.

Working begins by powering the system, which feeds the servomotor (M) and, consequently, releases compressed air to feed the pneumatic directional valve (11). Therefore, when the servomotor (M) is turning clockwise, it will be pulling the hydraulic plunger (7) upwards and, at the same time, the pneumatic directional valve (11) will be directing the compressed air to the lower pneumatic chamber (14), combining the pneumatic force with the force generated by the torque on the ball screw (29), thereby increasing the force that is being applied on the volume of oil that is stored in the upper hydraulic chamber (31), which begins to be displaced, passing through the hole (27) of the upper hydraulic chamber (31), forcing the opening of the upper check valve (24) and being led to the hydraulic pressure accumulator (25), where it will remain idle until it is used. The upper check valve (24) also has an outlet pressure line (26) and a hole (28) of the pressure outlet.

In the same upward movement, while the oil is being pumped into the pressure accumulator (25), the hydraulic plunger (7) begins to draw oil from the oil reservoir (16), which passes through the suction filter (17) going through the low oil suction line (19) and forcing the opening of the check valve (22), reaching the lower hydraulic chamber (9), where it will continue being filled until the pneumatic plunger (12) reaches the end of the stroke. Next, when the pneumatic plunger (12) finally arrives at the end of the upward stroke, the upper sensor (4) is activated and electronically controls the inversion of the turning direction of the servomotor (M), the inversion of the turning direction of the ball screw (29) thus occurring, which thereafter turns counter-clockwise, and the same electronic command that was sent inverts the position of the pneumatic directional valve (11), which now directs the compressed air to the upper pneumatic chamber (18) by means of the hole (10) which, once filled, will begin the downward process of the hydraulic plunger (7), which will exert a force on the volume of oil which is in the lower hydraulic chamber (9), and will begin to displace this oil outwardly, as far as the hole (20) of the lower hydraulic chamber (9), initially forcing the opening of the check valve (22) and leading to the hydraulic pressure accumulator (25), where it should remain until it is used.

In the same downward movement, while the oil is being pumped inside the pressure accumulator (25), the hydraulic plunger (7) begins to draw oil from the oil reservoir (16) into the upper hydraulic chamber (31), passing first through the suction filter (17), going through the upper oil suction line (21) and forcing the opening of the upper check valve (24) and, finally, arriving at the upper hydraulic chamber (31), where it will continue to be filled until the pneumatic plunger (12) reaches the end of the lower stroke, keeping the oil in this upper hydraulic chamber (31) until the time when reversal of turning direction of the ball screw (29) occurs and inversion in the direction of the displacement of the pneumatic plunger (12).

This process of oil pumping enters into a continuous regime until the pressure accumulator (25) is totally filled and, when it is totally full, it attains working pressure, whereupon the pressure sensor (30) is activated and command the de-energization of the pneumatic directional valve (11), where it will remain in a center-closed position, and also commands the de-energization of the servomotor (M), interrupting the oil pumping process, which will resume when a hydraulic actuator begins to move. Now, when a hydraulic actuator of the machine that is using this invention begins to move, the pressure sensor (30) records a drop in pressure and immediately powers the servomotor (M) and the hydraulic directional valve (11), continuing the oil pumping process from the point where it stopped, keeping this same working regime for all the time necessary. The reason for stoppage of the servomotor (M), and also the stoppage of the displacement of the pneumatic cylinder (15), when it does not have a hydraulic actuator moving, is to prevent an oil venting process, which is the circulation of oil that is not being used to carry out work, returning to the oil reservoir (16). Therefore, this invention eliminates oil heating, eliminates vibration and noises generated by metal-on-metal attrition and the useful life of the system is extended for much longer periods.

Therefore, the hydraulic unit (U), comprising the pneumatic cylinder (15) interlinked to the servomotor (M), electronically monitors the need to replace the volume of oil from the pressure accumulator (25) and, its smart system enables pumping with just the quantity of oil that will be used, eliminating waste of electric energy and creating a better work environment.

The invention claimed is:

1. A hydraulic unit with combined pneumatic/servomotor action, the hydraulic unit comprising:
   a servomotor;
   a pneumatic cylinder comprising:
      a pneumatic plunger configured to separate a lower pneumatic chamber from an upper pneumatic chamber,
      a pneumatic directional valve configured to direct compressed air into at least one of the lower pneumatic chamber and the upper pneumatic chamber, and
      a rod protruding out of the upper pneumatic chamber;
   a ball screw supported on rollers mounted on a bearing;
   a hydraulic pump comprising a hydraulic sleeve and a hydraulic plunger located inside the hydraulic sleeve;
   an oil reservoir;
   an upper check valve located between the upper hydraulic chamber and the oil reservoir;
   an upper sensor configured to detect a position of the pneumatic plunger;
   a hydraulic pressure accumulator; and
   a pressure sensor configured to detect an oil pressure in the hydraulic pressure accumulator;
   wherein the ball screw is configured to receive torque from the servomotor, wherein the hydraulic plunger is configured to be displaced based at least in part on a pneumatic force of the compressed air and a force generated by the torque received from the servomotor, thereby drawing oil from the oil reservoir into at least one of a lower hydraulic chamber and an upper hydraulic chamber and further into the hydraulic pressure accumulator.

2. The hydraulic unit according to claim 1, characterized in that the ball screw is coupled on the rod of the pneumatic cylinder so as together to displace the hydraulic plunger, situated in the hydraulic sleeve of the hydraulic pump.

3. The hydraulic unit according to claim 1, characterized in that the pneumatic cylinder works immersed in oil from the oil reservoir, using a low temperature generated by an expansion of the compressed air in the pneumatic cylinder to automatically cool the oil contained in the oil reservoir.

4. The hydraulic unit according to claim 1, characterized in that the upper sensor is activated when the pneumatic plunger arrives at an end of the upward stroke, the upper sensor electronically controlling inversion of a turning direction of the servomotor, thus causing the inversion in the turning direction of the ball screw, which thereafter turns counter-clockwise.

5. The hydraulic unit according to claim 1, characterized in that the servomotor electronically monitors a need to replace oil from the hydraulic pressure accumulator.

6. The hydraulic unit according to claim 1, characterized in that the hydraulic plunger contains sealing elements to eliminate oil leaks and loss of efficiency.

7. The hydraulic unit, according to claim 1, characterized by being configured to control and move hydraulic actuators in machines or equipment.

8. The hydraulic unit according to claim 1, characterized in that up to 90% of the volume of oil from the reservoir is reduced.

9. The hydraulic unit according to claim 1, characterized by generating savings of up to 90% in electric energy.

10. The hydraulic unit according to claim 1, characterized by dissipating heat of hydraulic oil.

* * * * *